United States Patent [19]
Breed

[11] 3,859,693
[45] Jan. 14, 1975

[54] SLIDING SNAP SHACKLE
[76] Inventor: Charles P. Breed, 1220 Boucher Ave., Annapolis, Md. 21403
[22] Filed: June 12, 1973
[21] Appl. No.: 369,295

[52] U.S. Cl. ................ 24/241 SL, 59/86, 114/108, 294/83 R
[51] Int. Cl. ............................................ F16g 15/00
[58] Field of Search .......... 59/86, 93; 294/75, 82 R, 294/83 R; 24/241 SL, 239; 114/114, 108

[56] References Cited
UNITED STATES PATENTS

| | | | |
|---|---|---|---|
| 659,425 | 10/1900 | White | 24/239 |
| 741,014 | 10/1903 | Covert | 294/83 R |
| 759,806 | 5/1904 | Broga | 24/241 SL |
| 1,062,653 | 5/1913 | Koons | 24/241 SL |
| 2,457,435 | 12/1948 | Beckman | 59/93 |
| 3,646,645 | 3/1972 | Bauer | 24/241 SL |

Primary Examiner—C. W. Lanham
Assistant Examiner—Gene P. Crosby
Attorney, Agent, or Firm—Fidelman, Wolffe, Leitner & Hiney

[57] ABSTRACT

A shackle is provided which is useful for temporary or removable connection of two members in a tension relationship, as where one member pulls or positions by tension the other member. The shackle, when formed of suitably corrosion-resistant materials is particularly useful for a variety of marine usages, wherein it may be fixed to a rope or cable or the like and attached to a member to be positioned by tension, such as a sail, a boom, or the like. The shackle is characterized by a hook, open in a direction generally perpendicular to the axis of a tension load, wherein the opening of the hook is closed by a sliding gate which is fixed and biased in a normally closed position, but which is readily retractable to open the hook for attachment or removal of the shackle.

7 Claims, 13 Drawing Figures

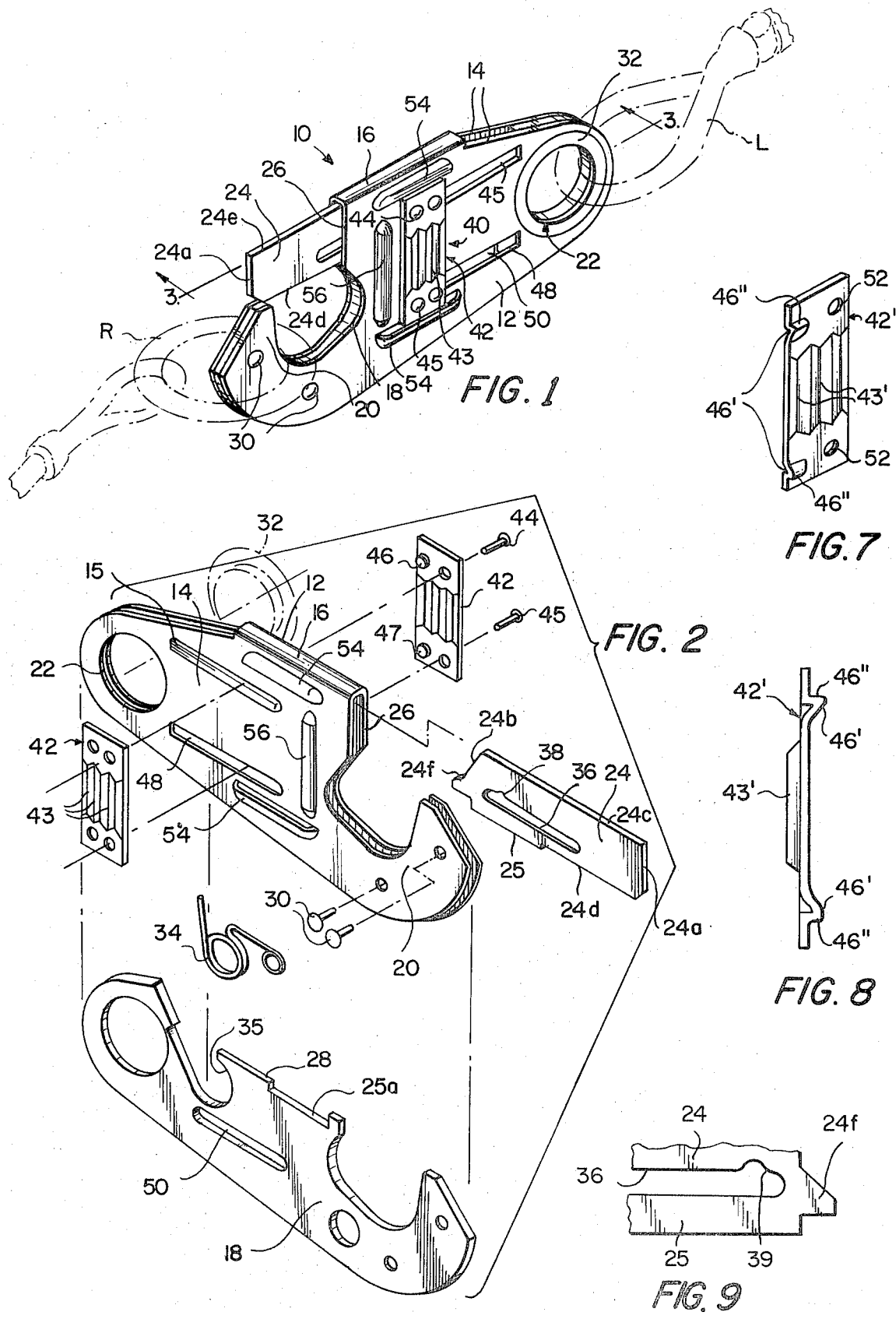

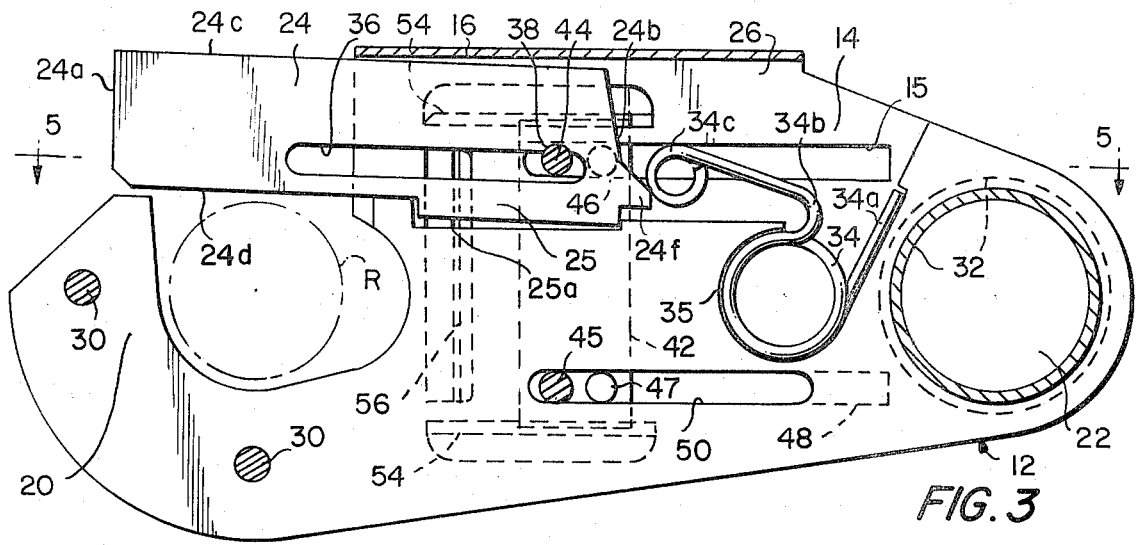
FIG. 3
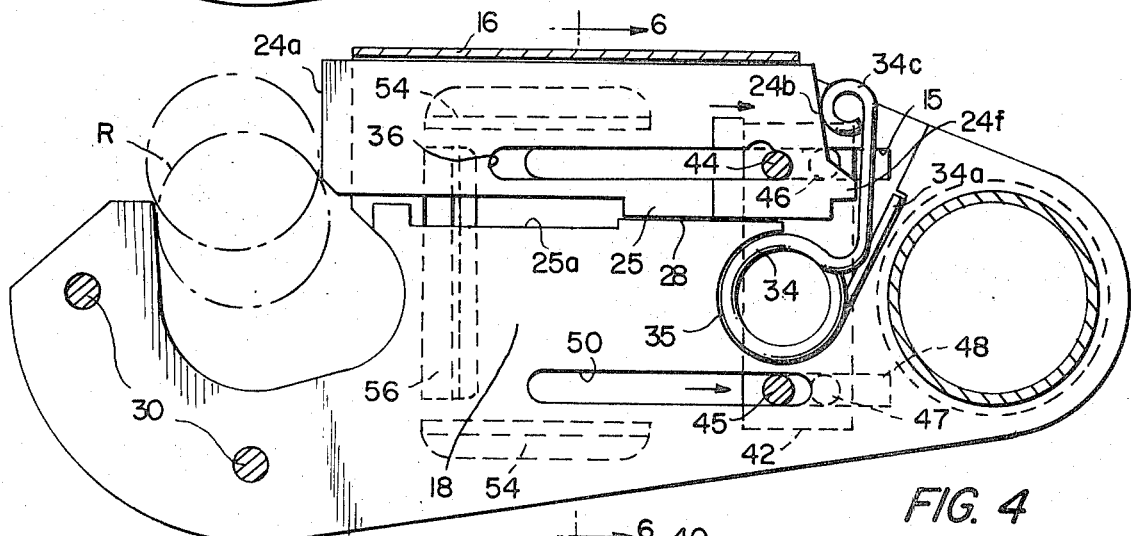
FIG. 4
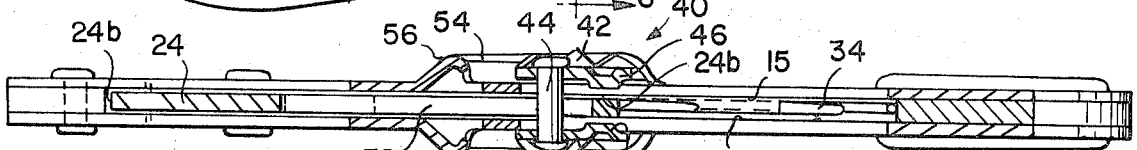
FIG. 5
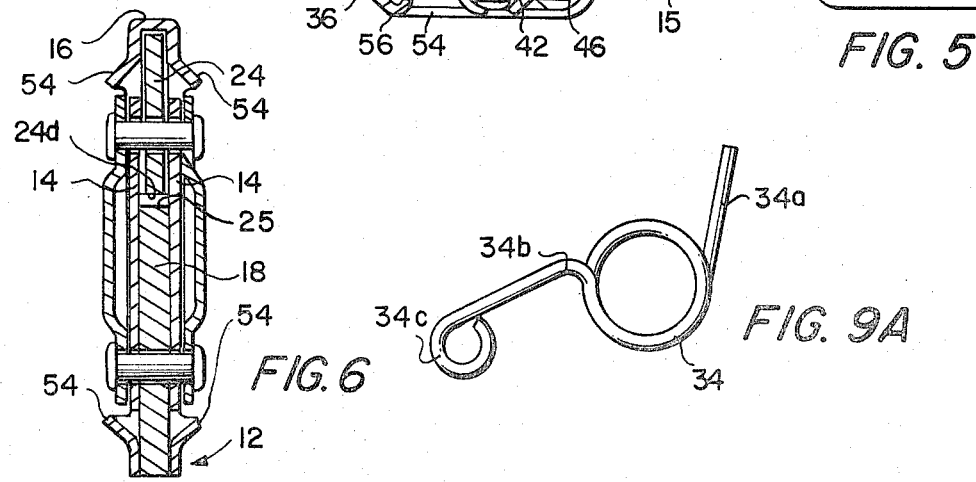
FIG. 6
FIG. 9A

SLIDING SNAP SHACKLE

The present invention relates to a particular means of attachment. More particularly, it relates to a shackle fastener intended to join two members which are in a relative tension relationship. Still more particularly, it relates to a shackle which is particularly adapted to interconnection of a rope, cable, line, or other pulling means with a member to be pulled or positioned by tension forces on such pulling means. In a preferred embodiment, the present invention relates to a shackle adapted to interconnect a rope, line, or the like to various and diverse elements of boat equipment and hardware.

A principal object of the present invention is to provide a shackle characterized by a tension load bearing hook member, open in a direction generally perpendicular to the axis of such tension load, wherein such opening is normally closed by a sliding gate member which is biased and locked in its normally closed position, but which is readily retractable to an open position for engagement or disengagement of the hook member.

A wide variety of shackle designs are known and available commercially, and are employed in a wide variety of applications. Most such shackles are characterized by a pivoting closure member which is locked in a closed position by a pin. Such shackles are expensive to manufacture and are frequently subject to malfunctioning. The pivoting closure member is ordinarily a load bearing part of the mechanism to some degree. When it is desired to open the shackle while under load, there are frequent problems associated with the loads transmitted by the closure member to the locking pin. Such loads are a principal cause of difficulty in releasing the closure for disengagement of the shackle from its load and the expected and normal source of failure of the shackle. Despite the fact that much effort has been expended in attempts to alleviate such problems, no solution has appeared in the prior art. It is believed that such problems are inherent in the pivoting closure because some load is inevitably transmitted by such arrangements to the locking pin in such fashion that the unlocking operation is substantially impeded.

It would clearly be desirable to provide a shackle which is not susceptible to such problems, and such objective and others apparent from the present disclosure are attained by the shackle of the present invention. The shackle is made up of a body having a load bearing hook member and a slideway or track substantially parallel to the axis of load, and as a hook closure member, a reciprocally sliding gate within such slideway which is biased to and locked in a normally closed position. The cooperation of the hook member and the sliding gate member is effective to open and close the shackle assembly without transmission of any substantial load to the gate or to the gate bias and locking means. Thus the shackle can be opened as readily when loaded as when unloaded and a far greater degree of reliability is thus afforded.

The biasing and locking means preclude accidental opening of the gate but readily open with little force when desired. Because neither the gate nor the gate bias and lock means are subject to substantial effects of any load, their operation is independent and unimpeded whether the shackle is loaded or not. While particular means for biasing and locking the gate are not of any criticality, it is noted that inasmuch as the gate member does not bear any substantial portion of the load assumed by the shackle, such means can be quite simple and inexpensive.

In order to assist those of ordinary skill in the art in an understanding of the present invention, it is discussed and exemplified in detail with reference to a particular embodiment which represents the best mode of practicing the invention presently known. It is not intended, however, that such exemplification be construed as limiting upon the scope of the invention which is defined only in the appended claims.

The detailed embodiment is shown in the accompanying drawings, wherein:

FIG. 1 is a perspective view of the embodiment of the shackle of the present invention;

FIG. 2 is a perspective exploded view of the embodiment shown in FIG. 1 and observed from the reverse side;

FIG. 3 is a cross-sectional view taken along lines 3—3 of FIG. 1 and viewed from the reverse side of FIG. 1, showing the shackle in its normally closed and locked position;

FIG. 4 is substantially the same as FIG. 3, but showing the gate in its retracted, open position;

FIG. 5 is a cross-sectional view taken on line 5—5 of FIG. 3;

FIG. 6 is a cross-sectional view taken on line 6—6 of FiG. 4;

FIG. 7 is a perspective view of the slider element which serves to retract the gate;

FIG. 8 is an end view elevation of the slider of FIG. 7; and

FIG. 9 is a fragmentary view of a part of the slot detail of the gate member.

FIG. 9A is fragmentary view of the spring which transmits a bias force to close the gate member.

FIG. 11 corresponds generally to FIG. 3, showing the shackle of the alternative embodiment in its normally closed and locked position;

Figure 10:
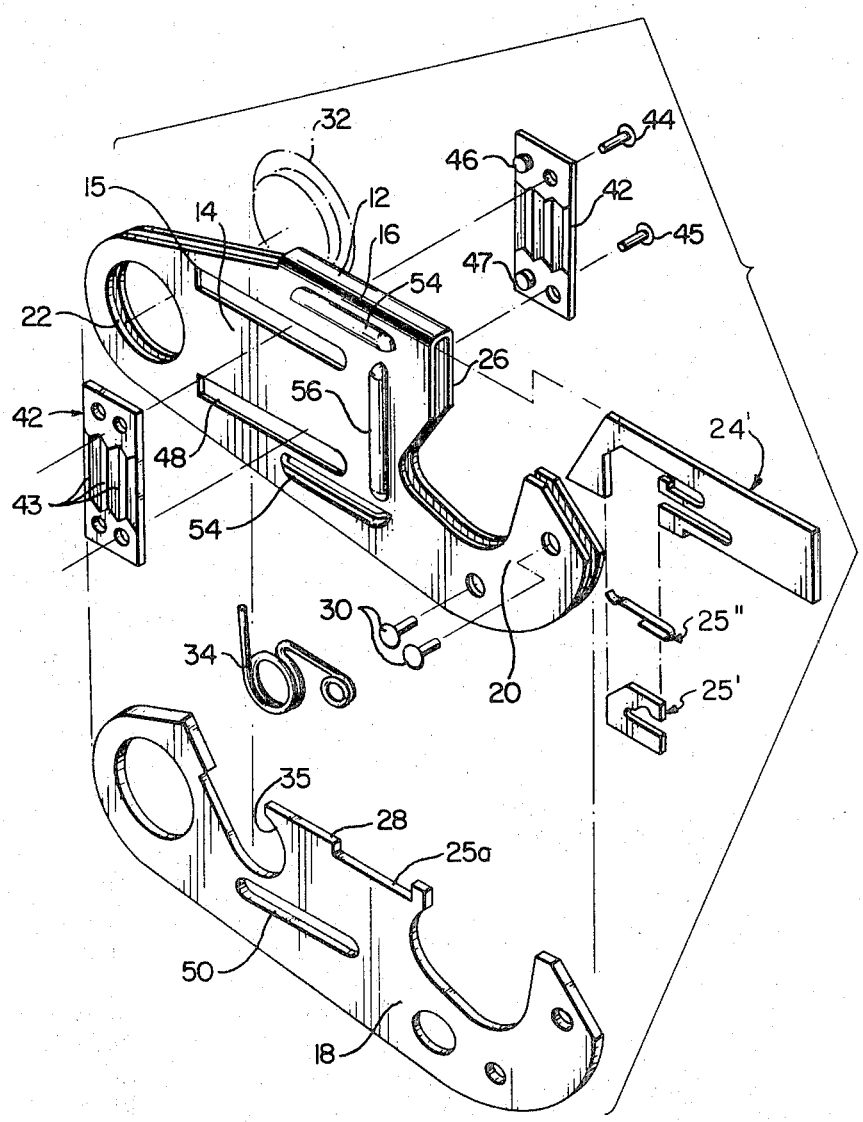
FIG. 10 is a perspective exploded view of an alternative embodiment corresponding generally to FIG. 2 above, wherein the same reference numerals have the same significance as hereinafter discussed with regard to FIG. 2.

With particular reference to the Figures, the shackle assembly embodiment of the present invention is designated generally as 10. Shackle 10 is made up of an elongated body 12 of a pair of substantially identical spaced parallel outer panels or side members 14 connected together by bight member 16. Between the outer panels 14 there is disposed intermediate member 18 which fits flush or contiguous therewith. While the shape of intermediate member 18 is generally similar to outer panels 14, there are significant differences as will hereinafter become apparent. The elongated body member 12, made up as defined of the sandwich of outer panels 14 and intermediate member 18, is configured at one end to provide an arcuate open hook member 20 and at the other end a closed ring member 22. The elements thus described constitute the load bearing portion of the shackle assembly as can readily be seen by reference to FIG. 1 where, by phantom lines, there are shown line "L" and ring "R" which represent elements attached to the shackle and loaded in tension. Closed ring member 22 is shown fitted with a grommet 32 which serves to fasten the elements of body member 12 together and is preferably a non-abrasive, friction resistant material which minimizes chafe on line "L". Rivets 30 also operate to fasten the elements of body member 12 together.

Elongated gate member 24 is slidably engaged with an elongated opening or recess 26 defined by side panels 14, bight 16, and intermediate member 18. The intermediate member 18 differs in shape from side panels 14 in part in that the linear surface 28 does not extend to contact bight 16, thus providing recess 26, which is thus generally parallel to the axis of an imposed load. Gate member 24 is held slidably within recess 26 by pin 44 fitted through aligned elongated slots 14 in side panels 14 and through elongated slot 36 in gate member 24, and by pin 45 fitted through aligned elongated slots 48 and 50 in side panels 14 and intermediate member 18, respectively. Pins 44 and 45 are attached to opposed slide members 40. Linear motion of slide members 40 thus moves the pins 44 and 45 in their respective slots.

Since gate member 24 is perforated by slot 36 which engages pin 44, gate 24 is not fixed in relation to slides 40. The elongated slot 36 is so disposed that when gate 24 is in its closed, extended position, pin 44 is adjacent to the end of slot 36 furthest from the hook member 20 and slides 40 are at their nearest permitted point of travel to hook 20. Movement of slides 20 and pin 44 away from hook 20 causes pin 44 to engage the end of slot 36, and continued movement pulls gate 24 into its retracted position. When slides 40 and pin 44 are returned to their original position, gate 24 is free to return.

The gate 24 is biased to the closed, extended position by torsion spring 34 seated in recess 35 provided therefor in intermediate member 18 and enclosed by side panels 14. The helical spring 34 is provided with a tangentially projecting bearing portion 34a and extended driving arm 34b terminating in bearing portion 34c. In operation, bearing portion 34a abuts the extended edge of recess 35 and bearing portion 34c rides upon the inward end of gate 24, defining bearing surface 24b, and foot 24f. Spring 34f is formed in such fashion that it transmits bias force to gate 24 at all times in a direction toward hook 20. Because of the arrangement of the elements, the bias force is greatest when gate 24 is retracted to the position shown in FIG. 4, and least when in the closed position shown in FIG. 3. The magnitude of force transmitted by bias spring 34 should be sufficient to effectively close the gate when open but not so great as to prevent ready opening of the gate.

Under the normal conditions of use, the bias spring 34 is not sufficient to prevent occasional accidental opening of gate 24, and the gate is therefore provided with locking means. As shown most clearly in FIG. 2, upper surface 28 of intermediate member 18 is provided with recess 25a while gate 24 is provided with a tab 25 adapted to engage recess 25a, when the gate 24 is in the normal closed position. The downward component of force from spring 34 upon projecting foot 24f tends to cause engagement of tab 25 and recess 25a, while the engagement of pin 44 and slot 36 provides downward motion of the gate except when pin 44 is aligned with notch 38, which occurs when the gate 24 is in the closed position. The downward movement thus causes engagement of tab 25 and notch or recess 25a in the desired configuration. Rearward motion of slides 40 causes pin 44 to move in the same fashion, which by bearing upon the shoulder portion 39, shown in detail in FIG. 9, notch 38 cams gate 24 upwardly resulting in disengagement and unlocking of tab 25 and recess 25a, thus permitting the gate to open.

While the foregoing description deals with all the operational elements and the manner of their cooperation, the preferred embodiment of the drawings illustrates several additional features which are advantageous. For example, slides 40 are provided with interiorly projecting guide pins 46 and 47, shown in FIG. 2, which engage slots 15 and 48, respectively to insure proper alignment of the slides 40. In addition, each slide 40 is made up of a generally planar sheet 42 which is additionally formed with stub pins 43 which aid in gripping the slides 40 with the fingers for retraction of the gate 24. In addition, each outer panel 14 is provided with outwardly projecting shield members 54 and 56 which serve to deflect or stop serendipitous outside forces which might otherwise accidentally engage and move slides 40 and cause an undesired opening of gate 24.

Figure 11:
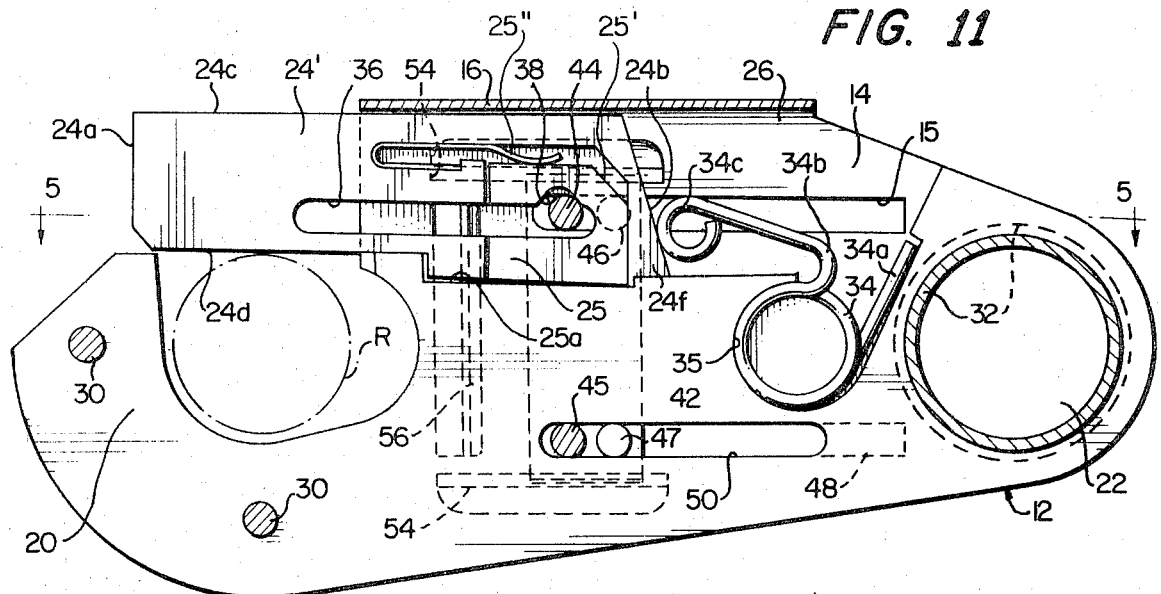
FIG. 11 is a cross-sectional view taken along a line corresponding to lines 3—3 of FIG. 1, and showing an alternative embodiment as in FIG. 10.
Figure 12:
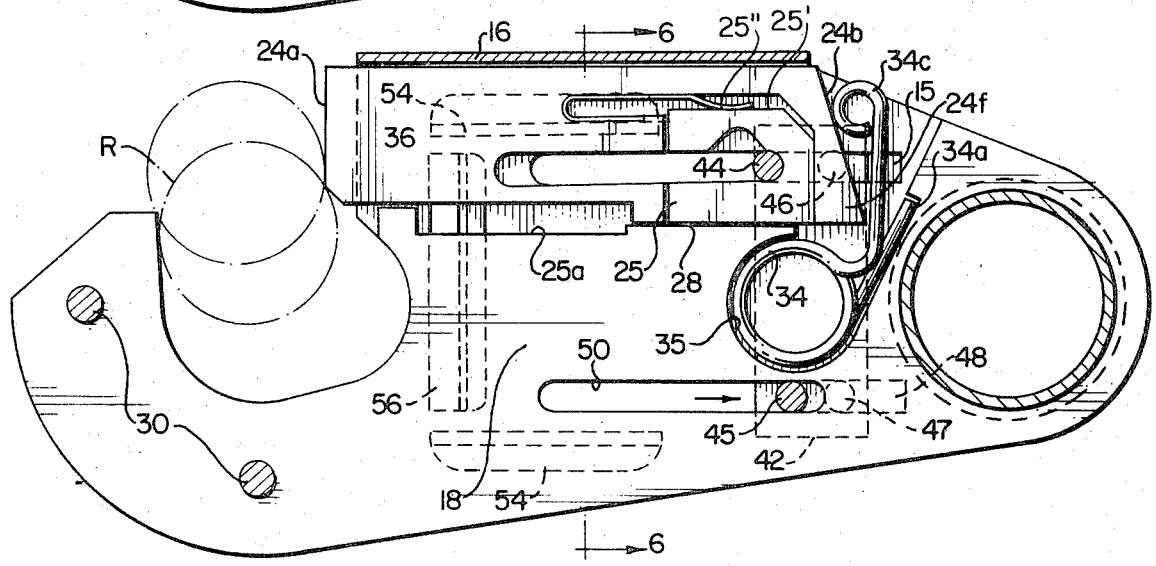
FIG. 12 is the same alternative embodiment as shown in FIG. 11, showing the gate in its retracted opened positions.

It will be readily apparent to those of ordinary skill in the art that many variations in the respective components of the shackle are possible and it is not intended that the present invention be limlied by the particular embodiment herein described in detail, but rather than equivalent means be considered as included herein. One example of alternative means which has been employed with success in the shackle of the present invention is the replacement of tab 25, which projects downwardly from lower surface 24d of gate 24' as a locking means, with a spring driven sear block, as shown in FIGS. 10, 11 and 12 as 25'. The associated bias means adapted to drive the sear block is shown in the same figures as 25". Such alternative means are equally effective in locking the gate 24 and the choice of particular means for locking the gate 24 can be made by those of ordinary skill in the art on the basis of the known characteristics of each such means.

Another such variation in means is illustrated in FIG. 7 and FIG. 8, which illustrate replacement of stub pins 46 with inward projections 46" which are simply formed by stamping the planar sheet 42' at the points designated 46'.

The materials of which the shackle and its component parts are made is also a matter well within the ordinary level of skill in the art and it should suffice to say that the particular materials selected should be those suitable to the particular use and environment where the shackle is to be employed. Depending upon the magnitude of tension loads to be absorbed and the environment of use, the component parts may be variously made of plastics, such as nylon, polycarbonates, polyesters, polyepoxides, and the like and reinforced compositions thereof, and metals, such as steel including stainless steel, aluminum, titanium, and the like.

In similar fashion, the dimension of the various parts is determined by the nature of use and the characteristics and is a matter well within the level of ordinary skill in the art. It is well known to adapted the dimensions to the magnitude and nature of loads to be met and to compensate for environmental factors such as extremes of temperature, exposure to abrasive conditions, or the like.

What is claimed:

1. A tension load bearing shackle comprising an elongated load bearing member with a hook portion at one end adapted to engage a load and an elongated internal slideway generally parallel to the axis of load of said elongated load bearing member, an elongated hook closing gate member slidably disposed in said slideway, means to bias said gate member to a hook closed position, means to lock said gate member in said hook closed position and opening means comprising a pair of slide members disposed on opposite sides of said load bearing member operatively connected to said gate member by at least one transverse pin engaging said slide members and said gate member and disposed through and movable along elongated aligned slots in opposite sides of said load bearing member to unlock said locking means, override said bias means and slidably retract said gate member to a hook opened position.

2. The shackle of claim 1 wherein said transverse pin engages an elongated axial slot in said gate member.

3. The shackle of claim 1 wherein said bias means is a spring.

4. The shackle of claim 1 wherein said locking means comprises a sear block engaged in a recess in said gate, a sear bias means, and a recess provided in said load bearing member adapted to receive said sear block in the hook closed position of said gate, wherein said sear block engages said recess to lock said gate.

5. The shackle of claim 1 wherein said locking means is a sear block disposed on said gate and a recess provided in said load bearing member is adapted to receive said sear block in the hook closed position of said gate and wherein said bias means serves to engage said tab and said recess.

6. The shackle of claim 1 wherein said locking means is a tab disposed on said gate and a recess provided in said load bearing member is adapted to receive said tab in the hook closed position of said gate and wherein said bias means serves to engage said tab and said recess.

7. The shackle of claim 6 wherein said opening means comprise a pair of slide members disposed on opposite sides of said load bearing member, operatively connected to said gate member by at least one transverse pin engaging said slide members and said gate member, disposed through and movable along elongated aligned slots in opposite sides of said load bearing member, said pin adapted to disengage said tab from said recess when said pin is moved in a direction away from said hook portion.

* * * * *